United States Patent

Seffinga et al.

[11] 4,020,591
[45] May 3, 1977

[54] PACKAGED TUNNEL-TYPE GREENHOUSE FOR ROW CROP

[76] Inventors: Jouke Seffinga, Rotbuchstrasse 46, Dubendorf, Switzerland, CH-8600; Andreas Meyer, Rooswies, Wangen, Switzerland, CH-8602

[22] Filed: July 17, 1975

[21] Appl. No.: 596,625

[52] U.S. Cl. .................. 47/28 R; 47/29; 47/58; 206/225; 206/226
[51] Int. Cl.² ........................ A01G 13/02
[58] Field of Search ........... 47/29, 28, 26; 206/225, 206/226; 135/15 PE; 242/118.32

[56] References Cited

UNITED STATES PATENTS

| 180,039 | 7/1876 | Kips | 206/225 |
|---|---|---|---|
| 453,501 | 6/1891 | Peterson | 206/226 |
| 963,099 | 7/1910 | Wells | 47/28 |
| 2,777,454 | 1/1957 | Kramer | 47/28 R X |
| 3,088,244 | 5/1963 | Commisso | 47/29 |
| 3,184,052 | 5/1965 | Gledhill | 206/226 X |
| 3,451,544 | 6/1969 | Sutter et al. | 206/226 |

FOREIGN PATENTS OR APPLICATIONS

| 209,625 | 11/1959 | Austria | 47/29 |
|---|---|---|---|
| 646,514 | 7/1964 | Belgium | 47/29 |
| 1,423,804 | 12/1966 | France | 47/29 |
| 1,314,473 | 12/1963 | France | 47/29 |
| 22,271 | 11/1961 | Germany | 47/29 |
| 1,276,171 | 6/1972 | United Kingdom | 47/29 |
| 570,197 | 6/1945 | United Kingdom | 206/226 |

Primary Examiner—Edgar S. Burr
Assistant Examiner—Steven A. Bratlie
Attorney, Agent, or Firm—Karl F. Ross; Herbert Dubno

[57] ABSTRACT

A tunnel-type greenhouse is packed in a mailing tube with wires constituting support-wicket halves received in a core tube on which a synthetic-resin foil usable as the greenhouse wall is wound. The wire wicket halves are joined together by short sleeves and formed into wickets that are driven into the ground in a row. The foil is unwound from the core tube which is broken in two at a central weakened region to form two stakes that are driven into the ground at the ends of the row. String unwound from the ends of the core tube is secured between these stakes and the apices of the end wickets. The foil is stretched between the stakes over the wickets and extra wickets may be engaged over the foil to hold it in place.

3 Claims, 3 Drawing Figures

PACKAGED TUNNEL-TYPE GREENHOUSE FOR ROW CROP

FIELD OF THE INVENTION

The present invention relates to a tunnel-type greenhouse adapted to use over a row crop. More particularly this invention concerns a packaged greenhouse and a method of setting up same.

BACKGROUND OF THE INVENTION

For both the hobby gardener or commercial grower it is often desirable to use a greenhouse-type arrangement over a row crop at least during the initial growth stages of the plants. A tunnel-type greenhouse may be provided for each row, covering the row so as to confine heat and humidity around the seedlings or young plants.

The known structures are often extremely flimsy, blowing away in any gust of wind to leave the plants uncovered. More sturdy structures have been relatively expensive and difficult to set up.

Since such arrangement are often used by the hobby gardener it is desirable to supply them in prepackaged form. Such a package is either very long, in order to accommodate the very long wires needed to form arches or wickets to support the foil constituting the walls of the greenhouse, or is wide and flat so as to contain the preformed wickets. Since it is often necessary to provide pointed stakes to secure the foil in place over the wickets, an additional problem is posed in the containment and shipping of these potentially dangerous items.

OBJECTS OF THE INVENTION

It is therefore an object of the present invention to provide an improved greenhouse of the above-described general type.

Another object is the provision of an improved greenhouse package and method of setting same up.

Another object is to provide such a greenhouse which may be contained in a very small space, and which can be shipped in a handy parcel without danger of damaging the plastic sheet.

Yet another object is to provide such a greenhouse which can be used by the hobby gardener and by small commercial nurseries.

SUMMARY OF THE INVENTION

The above objects are attained according to the present invention by providing a greenhouse which can be folded up and packed into a cylinder-shaped container meeting the postal regulations for shipment. When assembled the greenhouse comprises over a prepared flower bed several spaced apart arches or wickets driven into the ground and covered by a synthetic-resin sheet gathered at the ends and fastened to pegs or stakes which have been driven into the ground at the ends of the row of wickets.

For packing, the plastic sheet is folded in transversely, that is in its longitudinal direction and rolled around a tube made from synthetic-resin material. This core tube has in its middle a preperforated breaking line diagonal to the longitudinal axis of the tube for manual breaking of the tube into two pieces, each piece to be used as a peg or stake for fastening the plastic sheet at the row end as mentioned above. The internal diameter of the tube is large enough to house rods made from weatherproof, flexible, noncorrosive material. Two such rods are connected longitudinally together by a sleeve made from hard material with little flexibility to avoid deformation when the rods cant when bent into the shape of wickets or arches. The rolled-up plastic sheet leaves enough room on both ends of the tube to wind up rope or string which is later tied to the center of the outer wickets of the greenhouse and to the stakes.

The tube, with the plastic foil wound on it along with the string, and with the rods and a little bag containing the coupling sleeves and instructions, is pushed into the cylindrical mailing tube for shipment.

The advantage of this ready to assemble, prepackaged greenhouse according to the present invention is especially its low price. Because of low storage and shipping costs than the prior-art greenhouses it is especially suitable for use in small commercial nurseries and by the hobby gardener.

Thus in accordance with the present invention a greenhouse is made starting from a package comprising a mailing tube containing an elongated synthetic-resin foil wound on a centrally divisible core tube itself containing a plurality of wire wicket halves. The mailing tube further contains two strings wound on the uncovered ends of the core tube and a plurality of short joining sleeves. The greenhouse is set up by removing the sleeves and the wicket halves from the tube and joining every pair of such halves longitudinally together with one such sleeve. Thereafter each such joined-together pair is formed into a wicket and the wickets so formed are driven into the ground in an aligned row. The foil and the string are then unwound from the core tube and this tube is then broken in half and each tube half is driven into the ground at the respective end of the row. Thereafter the strings are used to secure the tube halves to at least the end wickets of the row of wickets and the foil is spanned over the wickets.

According to further features of this invention the wickets, each made of two pieces of heavy galvanized wire joined by a short galvanized sleeve, are formed into inverted-U arches and at least some of these wickets are engaged over the synthetic-resin foil after this is spanned over the other wickets.

With this arrangement an extremely durable tunnel-type greenhouse is provided ideally suited for protecting row crops in the initial stages of growth. The arrangement may be made at extremely low cost and is so compact that it can readily be shipped.

DESCRIPTION OF THE DRAWING

The above and other objects, features and advantages ill become more readily apparent from the following description, reference being made to the accompanying drawing in which.

SPECIFIC DESCRIPTION

Figure 1:
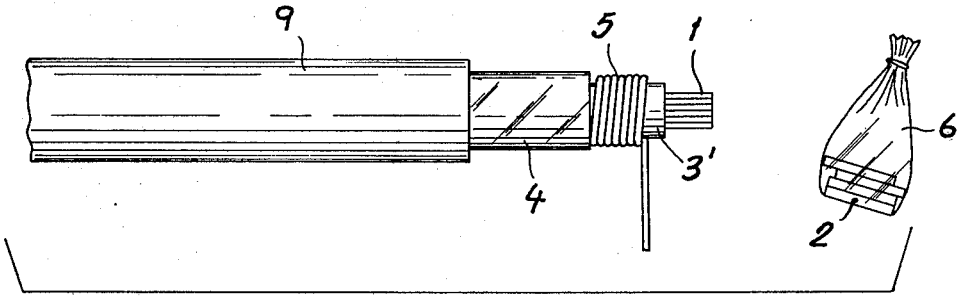
FIG. 1 is a side elevational view of greenhouse partly pulled out if its shipping tube.

In FIG. 1 the greenhouse is shown packed in a cylindrical mailing tube 9. To meet postal regulations of different regions this tube 9 can also be parallelepipedal with a square cross section. To fit such a packing, the parts of the greenhouse are dimensioned such that no single part exceeds the predetermined length of the packing.

Figure 2:
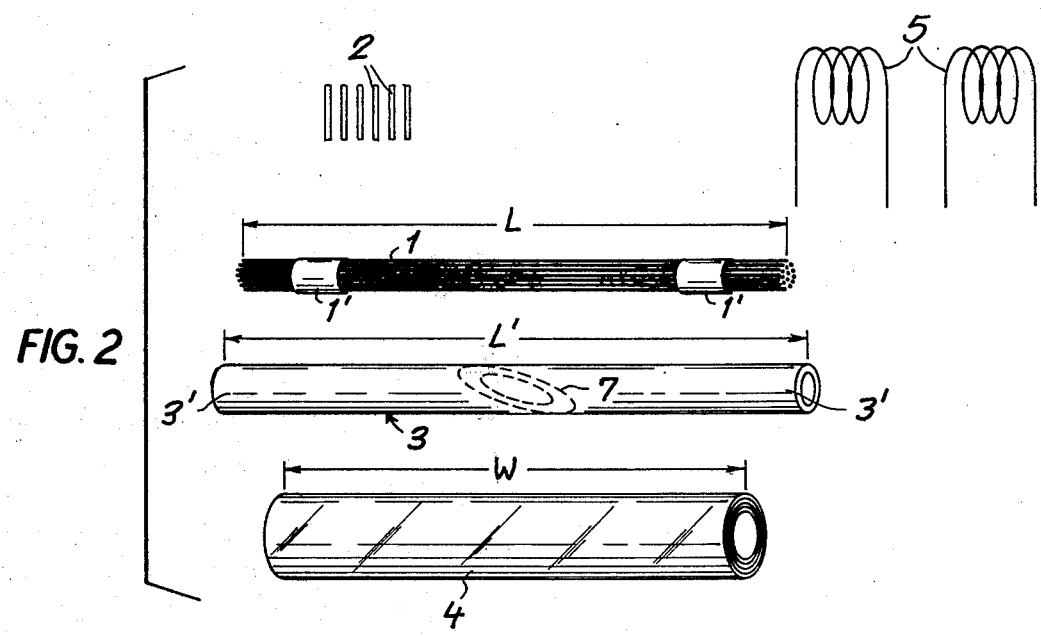
FIG. 2 is an exploded view of the prepackaged greenhouse of the present invention.

As shown in FIG. 2 the mailing tube 9 contains an even number of galvanized-wire rods 1 secured into a bundle by means of pieces of tape 1' and having an overall length L. A cylindrical synthetic-resin core tube 3 has an overall length L' slightly greater than the length L. This tube 3 is formed centrally with a weakened region 7 constituted as a row of perforations lying in a plane oblique or inclined to the longitudinal axis of the tube 3. The bundle of rods 1 is received in the tube 3.

Wound around the core tube 1 is a polyethylene foil or film 4 which has a width greater than the length L' but is folded in half so as to have a width W equal to somewhat less than the length L' to leave the ends 3' of the core tube 3 exposed when this foil 4 is wound around the core tube 3.

Two separate strings 5 are wound around these exposed ends 3'. The core tube 3 with the string 5 wound around each end 3', the foil 4 wound around its central region and the rods 1 received in its interior is fitted within the mailing tube 9 leaving room for short galvanized-metal sleeves 2 received in a small bag 6 with instructions for setting up of the greenhouse according to this invention.

The greenhouse according to the present invention is set up as follows:

First of all the mailing tube 9 is opened and the core tube 3 carrying the string 5 and foil 4 and containing the rods 1 is removed therefrom, along with the bag 6 containing the sleeves 2.

Figure 3:
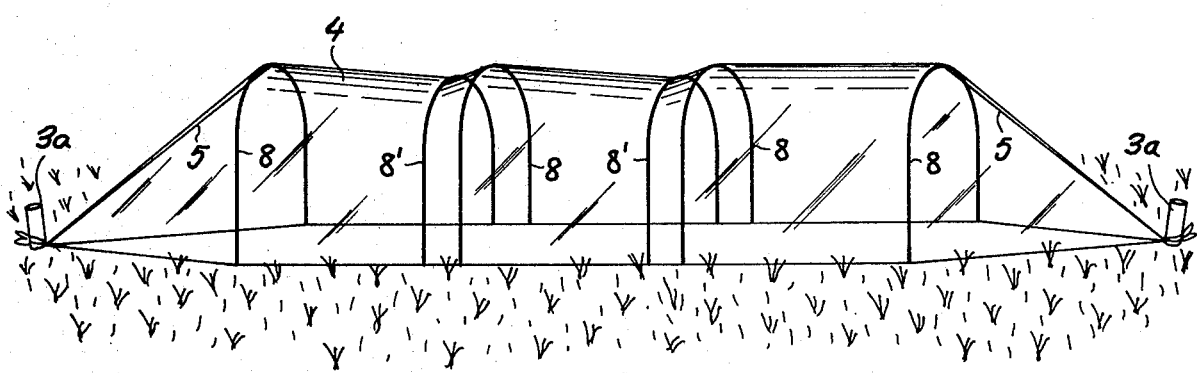
FIG. 3 is a perspective view of the assembled greenhouse of this invention.

Every two rods are joined together by a single sleeve 2, six of them being provided. Then four of the rod pairs so formed are driven into the ground in a row as indicated in FIG. 3, forming wickets 8.

The foil 4 is then unwound from the core tube 3 and laid next to this row.

The core tube 3 is then broken in half along the weakened region 7 and the two stakes 3a so formed are driven in at the ends of the row of wickets 8.

One of the strings 5 is connected between each stake 3a and the nearest wicket 8, and then the foil 4 is spanned over all of the wickets 8 and attached to the stakes 3a.

Finally the remaining two double-length wires are bent into wickets 8' and driven into the ground overlaying the foil 4 adjacent the two central wickets so as to hold this foil 4 tightly in place to resist wind.

The assembly according to the present invention can be produced at extremely low cost. Due to it compactness and easy shipping it is possible to supply it to the consumer with very little overhead. Furthermore virutally everything except the bag 6 and mailing tube 9 is used in the finished tunnel-type greenhouse so that there is very little waste.

We claim:

1. A packaged greenhouse comprising:
   a rigid and elongated core tube formed with a central weakened region for subdivision of said tube into a pair of like stakes;
   an elongated synthetic-resin foil wound on said core tube so as to leave at least one of the ends thereof uncovered;
   a predetermined even number of deformable metal wire wicket halves in said core tube and each having a length equal to substantially half the rectified length of a greenhouse support wicket;
   a number of short sleeves equal to half the number of said wicket halves and each dimensioned so as to receive snugly the ends of two such wicket halves;
   a coil of string wound around said core tube at the uncovered end thereof; and
   a mailing tube containing said short sleeves and said core tube containing said wicket halves and with said foil and string wound thereon, said core tube having a longitudinal axis and said weakened region lying in a plane inclined to the longitudinal axis of said core tube.

2. The greenhouse defined in claim 1 wherein said foil has a width greater than the length of said core tube and is folded transversely in half and wound doubled-over on said core tube.

3. A method of setting up a packaged greenhouse comprising a mailing tube containing a elongated synthetic-resin foil wound on a center portion of a centrally divisible core tube itself containing a plurality of wire wicket halves whereby said core tube has uncovered ends, said mailing tube further containing two strings wound on the uncovered ends of said core tube and a plurality of short joining sleeves, said method comprising the steps of:
   removing said sleeves and said wicket halves from said tubes and joining every pair of such halves longitudinally together with one such sleeve;
   thereafter forming each such joined-together pair into a wicket and driving said wickets into the ground in an aligned row;
   unwinding said foil and said strings from said core tube;
   breaking said core tube in half and driving each tube half into the ground at a respective end of said row and thereafter securing each of said strings between a respective tube half and the apex of the closest wicket;
   spanning said foil over said wickets; and
   driving at least one more wicket into the ground over said foil spanned over said row to hold said foil in place.

* * * * *